Jan. 2, 1940.  L. B. LOVE  2,185,209
METHOD AND APPARATUS FOR SAFE COLLECTION, DELIVERY,
AND TRANSPORTATION OF VALUABLES
Filed March 5, 1937   3 Sheets-Sheet 1

INVENTOR.
Leonard B Love

Jan. 2, 1940.　　　　　L. B. LOVE　　　　　2,185,209
METHOD AND APPARATUS FOR SAFE COLLECTION, DELIVERY,
AND TRANSPORTATION OF VALUABLES
Filed March 5, 1937　　　3 Sheets-Sheet 2
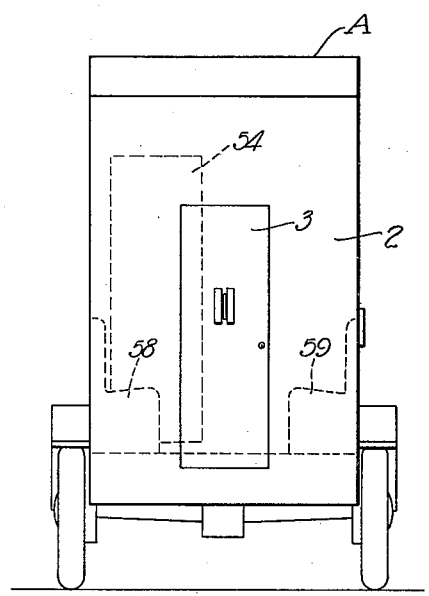
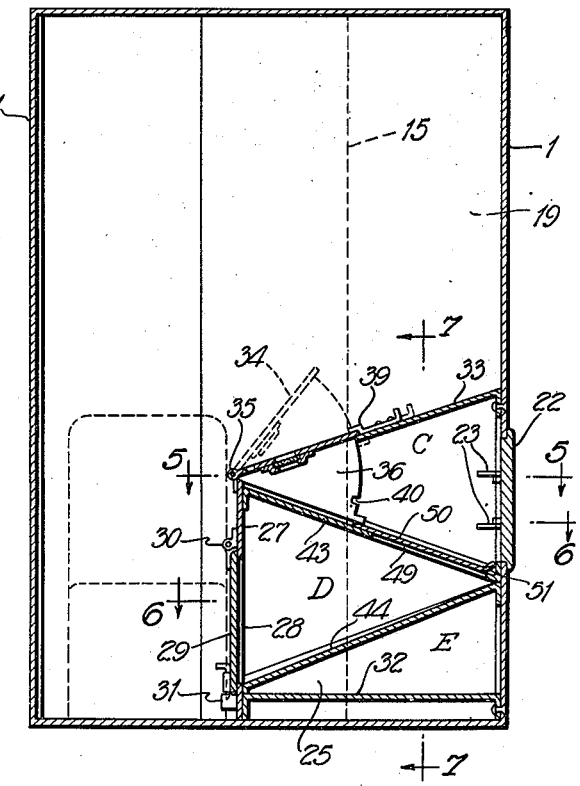
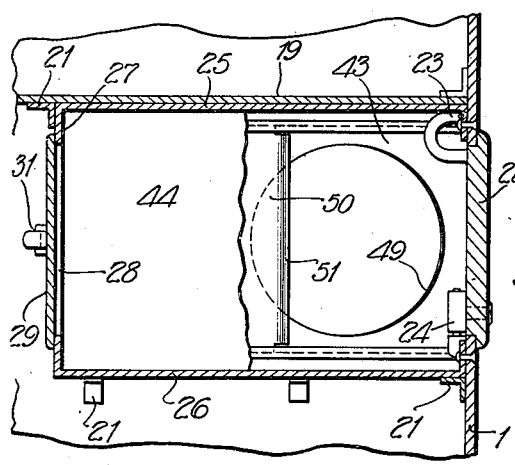
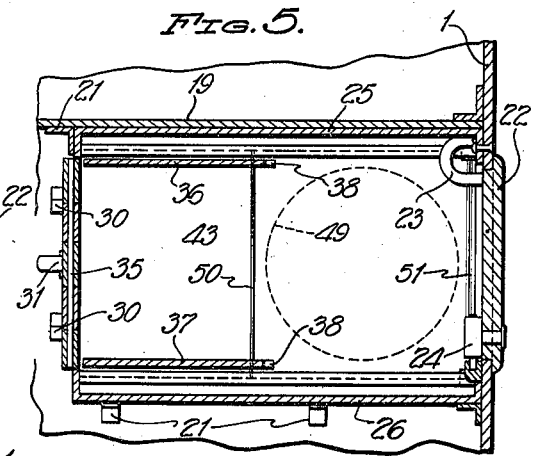
INVENTOR.
Leonard B Love Jan. 2, 1940.                L. B. LOVE                  2,185,209
   METHOD AND APPARATUS FOR SAFE COLLECTION, DELIVERY,
             AND TRANSPORTATION OF VALUABLES
                  Filed March 5, 1937          3 Sheets-Sheet 3
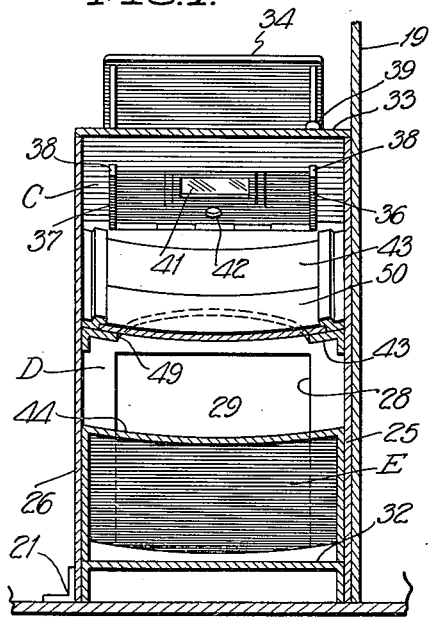
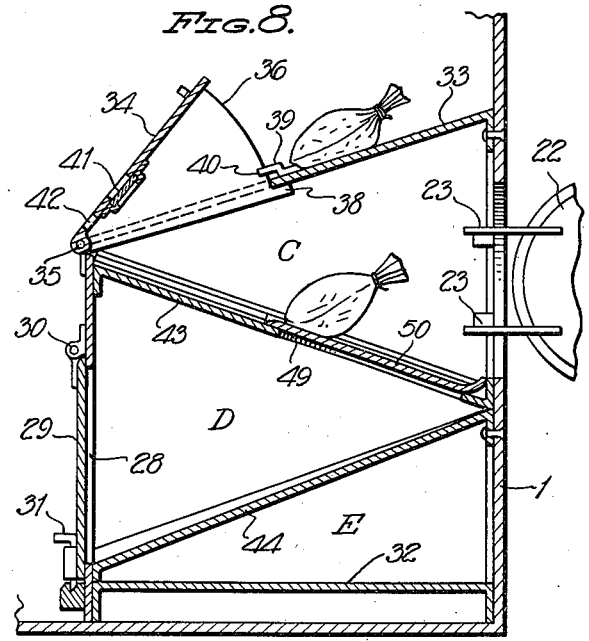
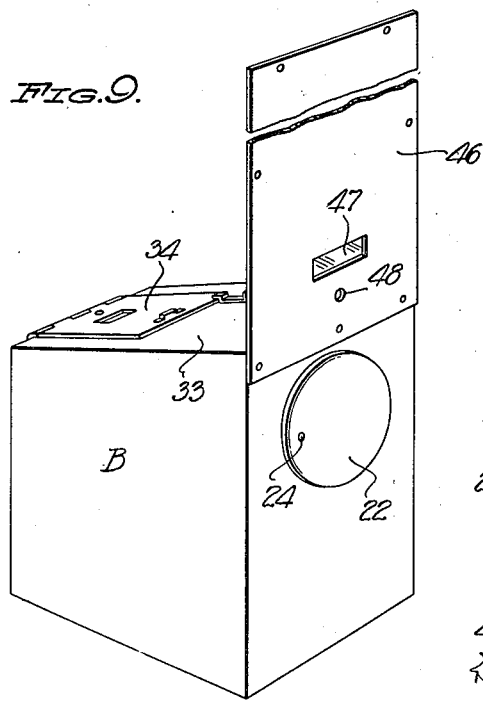
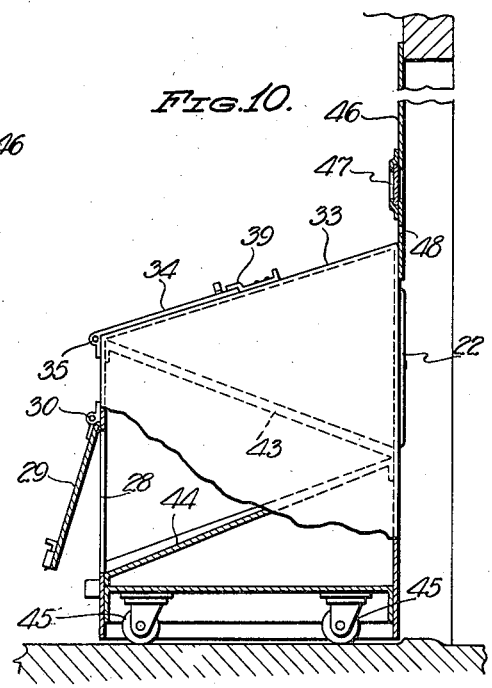
INVENTOR.
Leonard B. Love Patented Jan. 2, 1940

2,185,209

UNITED STATES PATENT OFFICE 2,185,209

METHOD AND APPARATUS FOR SAFE COLLECTION, DELIVERY, AND TRANSPORTATION OF VALUABLES

Leonard B. Love, New York, N. Y.

Application March 5, 1937, Serial No. 129,288

2 Claims. (Cl. 296—24)

This invention is an armored service method and the unit for carrying out the same such as is adapted for the transportation, collection and delivery of currency, jewelry, securities, mail and bullion to and from banking and commercial institutions, post offices, express carriers, railway cars and the like.

At the present time armored motor cars are used for the above mentioned services but the methods and equipment are of such character as to render the service liable to the hazards of holdup and robbery in such manner as to make such service little better, if any, than the usual motor car service accompanied by armed guards.

One type of armored car at present in use has an open interior in which valuables, guards and driver are all within the same compartment secured by a side door and thus all exposed to attack once the side door is opened.

Another type of armored car has a side door opposite the driver's seat and a partition in back of the driver's seat with doors in it. The guards are located behind this partition in the main compartment where the valuables are kept; when stopping to load or unload this type of armored car the guards in order to remove the valuables to be delivered must pass through the driver's compartment, opening the door in the partition between the main compartment and the driver's compartment. This type of armored car is unsafe because as soon as the side door of the driver's compartment is opened it exposes both guards and valuables to hold-up.

In a third and larger type of present day armored car or truck for carrying heavy loads of coin or bullion or other valuables to be collected, transported or delivered, the trucks are equipped with rear doors which, when open, exposes the interior of the truck where both guards and valuables are located in an unprotected manner to gunmen with only the protection of the armed guards.

This invention embodies a method and apparatus whereby only one package at a time is exposed and then always under the surveillance of the armed guards and the operator of a duplex unit serving to safely receive and deliver individual packages therefrom.

Furthermore, the invention contemplates an arrangement and method of operation such that the guards and valuables are always protected from effective attack even while pick-ups of valuables are being made, and yet while inaccessible from the exterior are nevertheless in position to efficiently defend themselves from attack.

With the foregoing in view I will now describe the method and apparatus of my invention in connection with the accompanying drawings, in which:

Fig. 3 is a rear elevation of the armored car shown in Figs. 1 and 2.

Fig. 4 is a sectional view on the plane of the line 4—4 of Fig. 1.

Fig. 5 is a sectional view on the plane of the line 5—5 of Fig. 4.

Fig. 6 is a sectional view on the plane of the line 6—6 of Fig. 4.

Fig. 7 is a sectional view on the plane of the line 7—7 of Fig. 4.

Fig. 8 is a sectional view on the plane of the line 8—8 of Fig. 6.

Fig. 9, perspective view of the portable duplex safe unit as adapted to be installed in the window or door opening of a building.

Fig. 10 is a side elevation, partly in section of the duplex safe unit as installed in a window or door opening of an express, post office or bank.

In detail—

Figure 1:
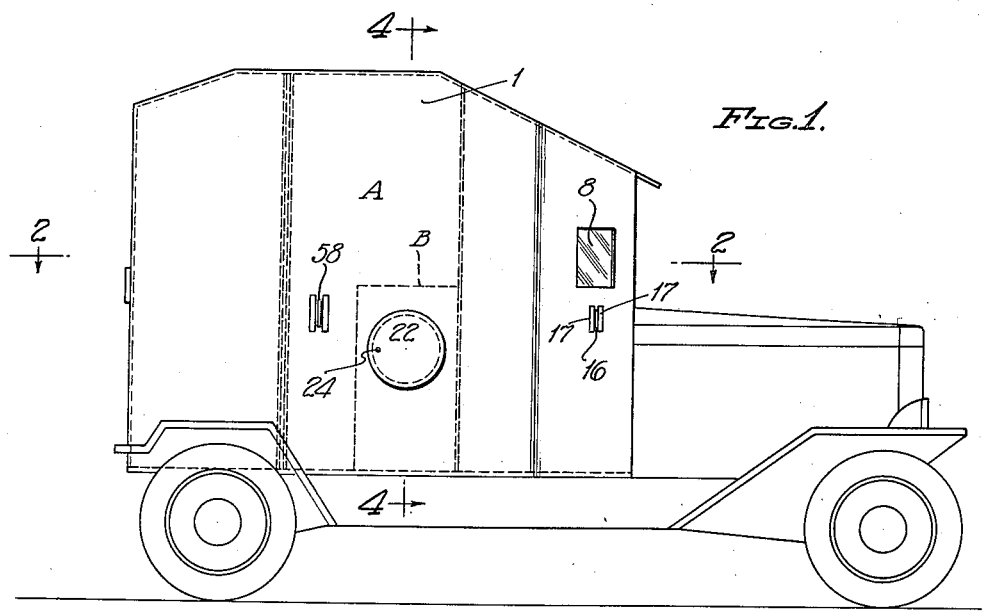
Fig. 1 is a side elevation of an armored car according to the present invention and carrying the duplex safe unit for collection and delivery of valuables.
Figure 2:
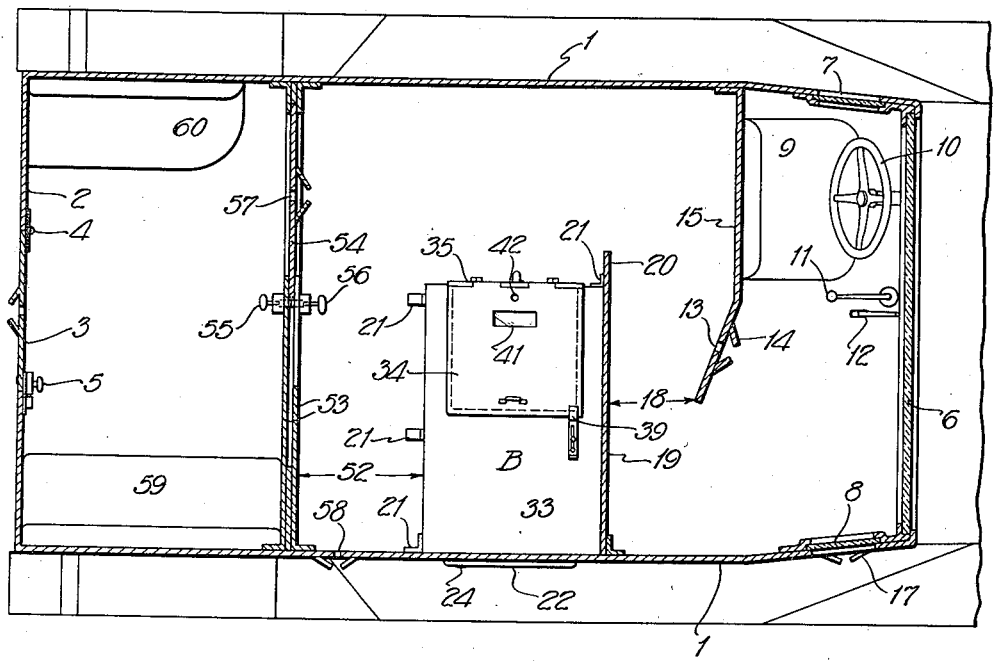
Fig. 2 is a sectional top plan view on the plane of the line 2—2 of Fig. 1 and showing the interior of the armored car.

With reference, firstly, to Figures 1 to 8 inclusive, the apparatus for carrying the present invention into practice comprises an armored truck A shielded by armor plate side walls 1 and back 2 within the latter of which there is a center door 3 opening inwardly, as shown, on hinges 4 and secured by a lock 5 manipulated from the inside by a knob and from the outside by a key, if desired. The windshield 6 of the front of the truck is of safety or bullet-proof glass mounted in the usual manner as are also the driver's compartment side windows 7 and 8. In the driver's compartment are the driver's seat 9, steering wheel 10 and the usual gear shift lever 11 and emergency brake 12.

Back of the driver's seat and extending from floor to truck roof is an armor plate partition 15 of the form shown and which does not extend from side to side of the truck but stops short of the right-hand side and is angled, the angled portion having a gunslot or porthole 13 with protectors 14 as shown and through which the driver when concealed therebehind can command a view to the front of the truck which is the most likely place of attack, while concealed therebeind. This armor plate partition 15 serves in use of failure of the safety or bullet-proof windshield 6 which is effective and remains intact against only about ten shots, and the angle portion of this partition is such that the driver is protected against gunfire directed through the window 8 beneath which there is a gunport or slot 16 with shields 17.

Immediately to the rear of the partition 15 but spaced therefrom a distance indicated at 18 is an upright armor plate partition 19 from truck floor to roof and slightly greater in extent, as indicated at 20, than the dimension of the duplex safe unit B of rectangular exterior form and which is secured in position thereagainst by suitable angle brackets 21.

The duplex safe unit B as applied to the armored car or truck A is of rectangular form in lateral cross-section and its outside is formed by the armor plate right side of the truck body through which there is a circular door 22 swinging on interior hinges 23 and secured by a suitable lock 24. The sides 25 and 26 of the duplex safe unit are closed at the back by an armor plate back wall 27 having a door opening 28 therethrough closed by the door 29 opening to the interior of the truck body and swinging on hinges 30; a suitable bolt or latch 31 to be operated by the driver is affixed to the door 29 and back wall 27. The armor plate bottom of the duplex safe unit is indicated at 32. The top 33 of the duplex safe unit is also of armor plate and is sloping, as shown, upwardly toward the side wall of the truck. In the top 33 is an opening of rectangular form which is covered by a combination gunshield and door 34 of armor plate hinged at its rearward edge as at 35 and provided with side shields 36 and 37 which telescope alongside the sides of the safe unit when his driver's access door is closed. This driver's access door has a stop 38 which prevents it from being elevated too far and yet permits it to be raised far enough to afford access while still shielding the driver; it may be latched in the open position by a sliding bolt 39 engaging a notch 40 or may be secured in the closed position by the same bolt engaging over the edge of the door 35. The access door 34 is provided with a sight opening 41 of bullet-proof glass and gunport 42 which enables the driver to command full view and fire toward the outside or collection and delivery door 22 should occasion arise.

Within the duplex safe unit a diagonal armor plate partition 43 extends from the upper rear edge of the back just below the hinge 35 of the access door forwardly and downwardly to the lower edge of the collection and delivery door 22 and from which location a second diagonal armor plate partition 44 slopes rearwardly to the lower door of the driver's second access door 29. The incline of the top 33 and the two diagonal partitions 43 and 44 is at a sharp enough angle so that bags of currency, packages of bills and securities and the like will move over the same at a rapid rate.

The construction of the duplex safe unit shown in Figs. 9 and 10 is identical with that just described except that being portable it is provided with rollers 45 and has an integral front with a top shield 46 secured thereto and provided with bullet-proof glass lookout 47 and porthole 48.

The construction of these duplex safe units is preferably welded armor plate though, of course, it does not depart from my invention to have them riveted, or of laminated steel or other constructions.

Thus divided by the diagonal partitions 43 and 44 the duplex safe unit comprises three chambers C, D, and E, the latter not being provided with a door unless desired.

The diagonal partition 43, adjacent the collection and delivery door 22, has an opening closed by a slide plate 50 with an upwardly turned forward edge 51, thus the collector may open this slide, deposit valuable packages through the opening 49 where they will ride rearwardly out of reach on the diagonal partition 44 to be removed to the interior of the truck through the driver's access door 29. The driver wishing to deliver a package to compartment C for removal through the delivery door 22 raises the access door 34 to the latched upward position, drops the bag or package, as shown, on the inclined safe unit top 33 whence it immediately slides to the rear and drops onto the forwardly inclined diagonal partition 43 sliding thereon toward the delivery door 22 to be stopped by the upturned tip 51 on the slide 50, and immediately having deposited a package for delivery the driver takes his station to the rear of the access door 34 which thus shields him while, at the same time, allowing him to cover the interior of the compartment C with a gun.

At the rear of the duplex safe unit B and spaced therefrom a suitable distance 52 is an armor plate partition 53 preferably of double spaced construction and extending from floor to roof and provided with a sliding door 54 with latches 55 and 56 on either side thereof and both of which must be operated in order to permit the opening of the door. A porthole 57 with the usual shielding is provided in this door and a similar porthole 58 is in the armor plate side of the truck to the rear of the duplex safe B forwardly, however, of the partition 53.

Between the partition 53 and the rear wall of the truck 3 is the guards' compartment provided with side seats 59 and 60 for guards and collectors.

The method in which the aforesaid equipment is used is as follows:

The armored car of my invention containing the duplex safe unit B arrives at the curb in front of John Doe & Company to make a delivery of a payroll, the guard and collector or delivery man open the rear door 3 which is immediately closed behind them. The guard takes a position at the entrance to John Doe & Company while the delivery man positions himself at the outside door 22 of the duplex safe unit B. The driver of the truck stands inside the truck behind the duplex safe unit, raises the top door 34 which forms his shield, drops the payroll package on the inclined partition 43 where it slides forward toward the outside door 22 at which it is to be received by the delivery man. The truck driver immediately closes the top inside door 34 and latches it with the bolt 39; he can then observe through the bullet-proof window 41 in the top door 34 when the collection and delivery man opens and removes the package through the outside door 22 and then closes the same again and enters the building followed by a guard. During travel from truck to building both guard and delivery man are covered with gun by the driver through the porthole in the side of the truck between the duplex safe B and the guard's compartment.

The delivery and collection man delivers to

John Doe & Company the package which has been removed from the truck and may, for instance, receive two packages of valuables in return for deposit at the bank. He returns to the truck, followed by the guard, who stands at the entrance while the collector opens the outside truck door of the duplex safe, pushes up the slide door 50, drops the packages through into compartment D, closes the slide and then locks the outside door, all under the observation of the driver who then removes the packages from the compartment D through the lower door 29.

It will be observed from the foregoing that, at all times the collection and delivery is under observation by the truck driver from protected positions at which he may fire upon anyone seeking to rob either the duplex safe unit or the collector-delivery man.

The duplex safe unit, as shown, may also be used in buildings, and the building may be kept locked at all times while, in the same manner as with the truck, collection and deposit of packages may be made through the outside safe door and under the observation of an armed attendant within the room in which the safe unit is located.

It is obvious that a system of delivery and collection may be used wherein two duplex safe units may be used, one located at a building such as a bank, post office or express office, and the other located in the truck, the truck being driven close to the building and the outside door on the truck and building safe units being at the same level so that quick, short delivery and collections may be made under a maximum of safety.

While in the foregoing I have described my invention in terms of one practical embodiment of the duplex safe unit, truck and method of operation, it is nevertheless to be understood that in practicing the same I may resort to any and all modifications falling within the scope of the appended claims without departing from the intended spirit and scope of my invention as claimed.

I claim:

1. The method of operating a duplex safe having receiving and delivery compartments surrounded by an armor plate enclosure with an exterior collection and delivery door which comprises, depositing delivery packages from within the enclosure through one compartment of the safe and receiving collected packages through another compartment of the safe, and handling all of the packages through the single exterior safe door.

2. In an armored truck having a body of armored wall construction, a safe within said body and having at least one diagonal partition dividing the same into plural compartments, a door opening and closure in said body wall providing access to one compartment of said safe, a deposit opening in said diagonal partition, a door opening and closure in said safe providing access to the partition door opening, one of said compartments being accessible through the body wall safe closure and another of said compartments being accessible through said body wall safe closure and partition opening, and means in another portion of said safe providing access to the compartment served by said partition deposit opening whereby the contents of said last mentioned compartment may be removed to within the truck body.

LEONARD B. LOVE.